(12) United States Patent
Yoshikawa et al.

(10) Patent No.: US 10,213,879 B2
(45) Date of Patent: Feb. 26, 2019

(54) SOLDER ALLOY

(71) Applicant: SENJU METAL INDUSTRY CO., LTD., Tokyo (JP)

(72) Inventors: Shunsaku Yoshikawa, Tokyo (JP); Hikaru Nomura, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/362,421

(22) Filed: Nov. 28, 2016

(65) Prior Publication Data

US 2017/0151636 A1 Jun. 1, 2017

(30) Foreign Application Priority Data

Nov. 30, 2015 (JP) ................................. 2015-233363

(51) Int. Cl.
*C22C 13/00* (2006.01)
*B23K 35/26* (2006.01)
*C22C 13/02* (2006.01)

(52) U.S. Cl.
CPC ............ *B23K 35/262* (2013.01); *C22C 13/00* (2013.01); *C22C 13/02* (2013.01)

(58) Field of Classification Search
CPC .................................................... B23K 35/262
See application file for complete search history.

(56) References Cited

U.S. PATENT DOCUMENTS

| | | | |
|---|---|---|---|
| 4,929,423 A | 5/1990 | Tucker et al. | |
| 5,851,482 A | 12/1998 | Kim | |
| 5,980,822 A | 11/1999 | Moon et al. | |
| 6,474,537 B1 | 11/2002 | Hasegawa et al. | |
| 8,816,214 B2 * | 8/2014 | Ziegler | H05B 3/84 |
| 9,221,131 B2 | 12/2015 | Ingham et al. | |
| 2001/0002982 A1 | 6/2001 | Sarkhel et al. | |
| 2003/0021718 A1* | 1/2003 | Munekata | B23K 1/0016 420/560 |
| 2003/0034381 A1 | 2/2003 | Nakatsuka et al. | |
| 2003/0201310 A1 | 10/2003 | Nakatsuka et al. | |
| 2004/0062679 A1 | 4/2004 | Munekata et al. | |
| 2005/0005736 A1 | 1/2005 | Ueshima | |
| 2006/0011709 A1 | 1/2006 | Ojima et al. | |
| 2007/0172381 A1 | 7/2007 | Deram | |
| 2007/0295528 A1 | 12/2007 | Nishi et al. | |
| 2008/0061117 A1 | 3/2008 | Munekata et al. | |
| 2008/0292492 A1 | 11/2008 | Ingham et al. | |
| 2009/0236013 A1 | 9/2009 | Ueshima | |
| 2010/0297470 A1 | 11/2010 | Munekata et al. | |
| 2011/0050051 A1 | 3/2011 | Kondo et al. | |
| 2015/0146394 A1 | 5/2015 | Terashima et al. | |
| 2016/0107267 A1 | 4/2016 | Ingham et al. | |

FOREIGN PATENT DOCUMENTS

| | | | |
|---|---|---|---|
| CN | 1460572 A | 12/2003 | |
| CN | 1689751 A | 11/2005 | |
| CN | 101239424 A | 8/2008 | |
| CN | 101862925 A | 10/2010 | |
| CN | 101381826 B | 11/2012 | |
| EP | 1245328 A1 * | 10/2002 | ........... B23K 35/025 |
| EP | 1841561 A | 10/2007 | |
| JP | 2001-225188 A | 8/2001 | |
| JP | 3312618 B | 5/2002 | |
| JP | 2003-046229 A | 2/2003 | |
| JP | 2003-266193 A | 9/2003 | |
| JP | 2005-001000 A | 1/2005 | |
| JP | 2008-031550 A | 2/2008 | |
| JP | 4225165 B | 12/2008 | |
| JP | 2010-206006 A | 9/2010 | |
| JP | 2011-251310 A | 12/2011 | |
| KR | 100756072 B | 9/2007 | |
| KR | 10-2007-0118588 | 12/2007 | |
| WO | WO-0103878 A1 * | 1/2001 | ........... B23K 35/262 |
| WO | WO-2011/102034 A | 8/2011 | |
| WO | WO-2011107342 A1 * | 9/2011 | ............... H05B 3/84 |

OTHER PUBLICATIONS

Office Action dated Apr. 26, 2016 for the corresponding Japanese Patent Application No. 2015-233363.
Office Action dated Feb. 16, 2016 for the corresponding Japanese Patent Application No. 2015-233363.
Office Action dated Mar. 13, 2017 for the corresponding Korean Patent Application No. 10-2016-0160025.
Office Action dated Mar. 30, 2017 for the corresponding Taiwanese Patent Application No. 10620348690.
Office Action dated Feb. 14, 2017 for the corresponding Philippines Patent Application No. 1/2016/000448.
Extended European Search Report dated Mar. 6, 2017 for the corresponding European Patent Application No. 16200965.8.
Office Action dated Sep. 14, 2017 for the corresponding Chinese Patent Application No. 201611082455.8.
Office Action dated Mar. 21, 2018 for the corresponding Mexican Patent Application No. MX/a/2016/015710.
Office Action dated Jan. 19, 2018 for the corresponding Chinese Patent Application No. 201611082455.8.
Office Action dated Apr. 25, 2018 for the corresponding Chinese Patent Application No. 201611082455.8.

* cited by examiner

*Primary Examiner* — Jessee R Roe
*Assistant Examiner* — Jophy S. Koshy
(74) *Attorney, Agent, or Firm* — Leason Ellis LLP

(57) ABSTRACT

A solder alloy has an alloy composition consisting of, in mass %: Bi: 0.1 to 0.8%; Ag: 0 to 0.3%; Cu: 0 to 0.7%; P: 0.001 to 0.1%, with the balance being Sn. A total amount of Ag and Bi is from 0.3 to 0.8% in the alloy composition.

4 Claims, 1 Drawing Sheet

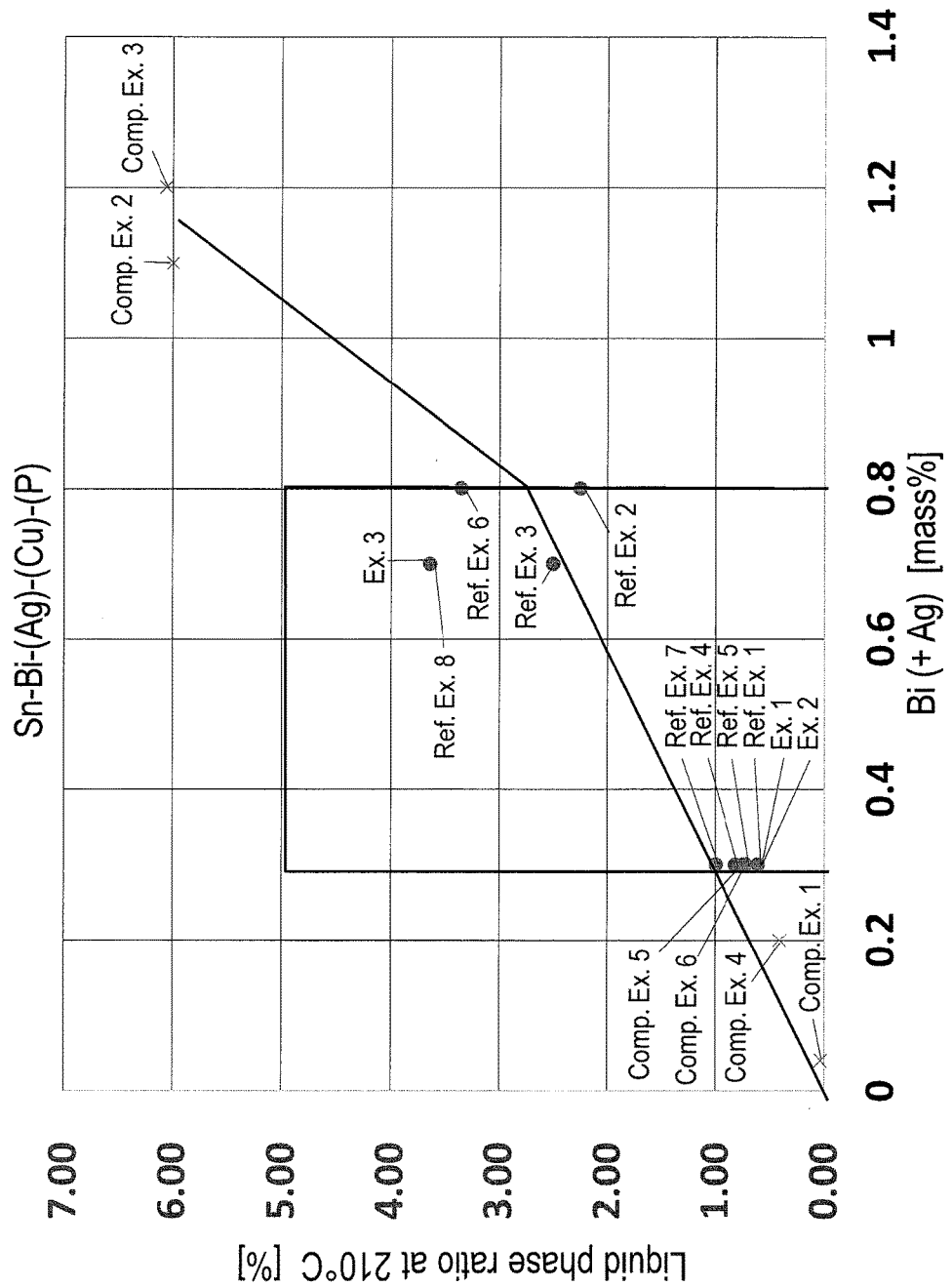

SOLDER ALLOY

CROSS-REFERENCE TO RELATED APPLICATION(S)

The present application claims priority under 35 U.S.C. § 119 to Japanese Patent Application No. 2015-233363, filed Nov. 30, 2015. The contents of this application are incorporated herein by reference in their entirety.

TECHNICAL FIELD

The present invention relates to a solder alloy that suppresses fillet abnormality.

BACKGROUND ART

A mounted substrate including a printed board and an electronic components mounted thereon is used in home appliances such as washing machines, refrigerators and air conditioners, and electronic equipments such as televisions, videos, radios, computers, copying machines and communication equipments. In addition to a single layer substrate, a laminate substrate including a plurality of substrates is used in a mounted substrate in order to obtain satisfactory functions. As a method for the conduction between substrates and a method for mounting electronic components on a substrate, examples thereof include a method for connecting by surface mounting and a method for mounting by inserting a terminal in a though-hole of a substrate. As the step of mounting on a printed board, examples thereof include flow soldering, reflow soldering, manual soldering and the like. Of those, the method for mounting by inserting a terminal in a though-hole is used as the mounting of electronic components having a certain degree of a size from the standpoints of connecting strength and the like. Flow soldering is generally used as the mounting step.

For example, Patent Document 1 discloses Sn—Cu—P—Bi solder alloy as a solder alloy for flow soldering. This solder alloy is excellent in that wettability is improved by the addition of P and additionally a melting temperature is lowered by the addition of Bi, thereby the occurrence of a trouble in operation of electronic components mounted can be suppressed. However, in the case of inserting a terminal in a through-hole and conducting flow soldering, further investigations are required in addition to the improvement in wettability of a solder.

A terminal inserted in a through-hole is connected to a printed board through solder fillet (hereinafter simply referred to as "fillet") formed between a land of a printed board and the terminal. In such a case, liftoff phenomenon sometimes occurs in the fillet depending on the composition of a solder alloy for forming the fillet and a lamination state of the board. The liftoff phenomenon is a phenomenon that a gap is generated between the land and the fillet, and this phenomenon leads to poor conduction between the board and the terminal. In view of this, various investigations have been made to suppress the liftoff phenomenon.

For example, Patent Document 2 discloses Sn—3Ag-xBi—0.5Cu (x=0, 1, 2, 3 or 4, the unit is mass %) solder alloy in order to maintain high reliability of connection strength of surface-mounted electronic components. This patent document describes the investigation results of the relationship between Bi content and liftoff phenomenon, strength or shrinkage cavity, and discloses the results that those properties are satisfied when the Bi content is 0 mass % or 1 mass %. This patent document further discloses a solidus temperature and a liquidus temperature of those alloy compositions. Patent Document 3 proposes Sn—0.7Cu-(0.35 or 0.7)Bi solder alloy in order to enhance bonding strength without using Ag. This patent document discloses that the occurrence of liftoff phenomenon and the like is accelerated by the addition of Bi. Patent Document 4 proposes that, in Sn—Ag—Bi—In solder alloy, Bi content is from 0.1 to 5 wt % and In content is from 3 to 9 wt %, and additionally a coefficient of linear expansion of a board is a predetermined range, in order to avoid the generation of cracks even after heat cycle in surface-mounted electronic components. This patent document further describes that liftoff phenomenon occurs by the addition of a large amount of Bi.

PRIOR ART DOCUMENTS

Patent Document

Patent Document 1: Japanese Patent No. 4225165
Patent Document 2: JP-A-2003-046229
Patent Document 3: JP-A-2001-225188
Patent Document 4: JP-A-2010-206006

SUMMARY OF THE INVENTION

Problems that the Invention is to Solve

Thus, Patent Documents 2 to 4 describe that Bi cause the occurrence of liftoff phenomenon, but there are the following respective problems in the connection between a land and a terminal.

Patent Document 2 discloses Sn—Ag—Cu solder alloy in which Bi is 0 mass %. However, the solder alloy does not contain Bi, and therefore, there is a problem that the fillet is deteriorated by thermal fatigue. This patent document further discloses a solder alloy containing Bi in an amount of 1 mass % or more. However, the liftoff phenomenon is judged using only six terminal connectors each having 6 terminals (36 places in total), and this is insufficient for judging liftoff phenomenon. The solder alloy contains Bi in an amount of 1 mass % or more, and it is therefore considered that there is a possibility that liftoff phenomenon occurs when the judgment places are further increased. Furthermore, the liquidus temperature and solidus temperature described in Patent Document 1 are a temperature in an equilibrium state, and the actual situation when bonding and when cooling is not reflected. Additionally, the properties of a solder alloy in a solid-liquid coexistence region greatly vary depending on alloy composition even in an equilibrium state, and due to this, time until a solder alloy solidifies to an extent such that a terminal does not detach also differs. For this reason, the occurrence of liftoff phenomenon cannot be sufficiently suppressed when a liquidus temperature and a solidus temperature are merely disclosed. In other words, liftoff phenomenon cannot be sufficiently suppressed by merely specifying a liquidus temperature and a solidus temperature in an equilibrium state.

Patent Document 3 discloses Sn—Cu—Bi solder alloy having Bi content of 0.35 mass % or 0.7 mass %. As described before, the liftoff phenomenon is a phenomenon that a gap is formed between a land and a fillet, and occurs by segregation of Bi in a solder alloy during solidification. This patent document discloses that Bi is liable to cause the defect of liftoff phenomenon. However, properties of a solder alloy in a solid-liquid existence region greatly differ, and a thickness of a board and the number of lamination thereof also differ, in addition to the temperature of a jet solder during flow soldering. From those facts, there is a case that the occurrence of the liftoff phenomenon cannot be immediately suppressed by focusing on only an alloy composition.

In is an essential element in Patent Document 4, and therefore, an In oxide film is liable to be formed. As a result, a solder alloy becomes sticky, and solder bridge and solder icicles are liable to be generated in fillet, and when terminals are electrically conducted with each other, poor connection occurs.

Thus, only the liftoff phenomenon has been conventionally considered as poor connection in fillet. The problem in the fillet is not only liftoff phenomenon, but includes the generation of solder bridges and solder icicles. Thus, it is necessary to solve those fillet abnormalities based on the actual situation.

An object of the present invention is to provide a solder alloy capable of suppressing the occurrence of fillet abnormality, more specifically, suppressing both of the generation of liftoff phenomenon and the generation of solder bridges and solder icicles in a fillet, and additionally suppressing the deterioration by thermal fatigue.

Means for Solving the Problems

The present inventors have made earnest investigations on Sn—Bi solder alloy capable of suppressing the deterioration by thermal fatigue in lead-free solder alloys. The present inventors have first focusing on the fact that, in addition to the adjustment of Bi content to a predetermined range in order to suppress the occurrence of liftoff phenomenon, it is necessary to consider time gap during solidification, caused from a thickness of a board and the number of lamination. The liftoff phenomenon occurs by the segregation of Bi as described before. In the case of conducting flow soldering, a jet solder side of a board is difficult to get cold, and a side opposite the jet solder side immediately gets cold. This becomes further remarkable in a laminate board. Thus, the occurrence of liftoff phenomenon can be suppressed by considering time gap in cooling.

In view of the above, the present inventors have considered time gap during solidification in addition to a solder alloy composition in order to suppress the occurrence of liftoff phenomenon and generation of solder bridges and solder icicles, and have made further investigations. It is preferred, as the conditions for conducting flow soldering with Sn—Bi solder alloy that a solder alloy is substantially completely a liquid phase at 235° C. and additionally is mostly a solid phase at 210° C. The reason that a solid phase remains at 235° C. is considered to be caused by a remaining solder alloy unmelted. When the amount of the remaining solder alloy unmelted is large, it is likely becomes the cause of solder bridges and solder icicles in a fillet. On the other hand, when a liquid phase at 210° C. remains, it is likely becomes the cause of the occurrence of liftoff phenomenon by segregation during solidification.

In the following description, the term "solid phase ratio" means a proportion of a solid phase occupied in the whole volume of a solder alloy at a certain temperature, and the term "liquid phase ratio" means a proportion of a liquid phase occupied in the whole volume of a solder alloy at a certain temperature.

The solid phase ratio and liquid phase ratio used in the above investigations are obtained based on an alloy composition of a solder alloy, but is not directly obtained from the alloy composition. A temperature range between a liquidus temperature and a solidus temperature is a solid-liquid coexistence region in an equilibrium diagram. However, properties of the solder alloy in the solid-liquid coexistence region cannot be immediately determined from the equilibrium diagram, considering the actual situation of flow soldering. Furthermore, even if the condition of flow soldering has been an equilibrium state, a solid phase and a liquid phase do not unitarily increase and decrease over a range of from a liquidus temperature to a solidus temperature. The proportions of a solid phase and a liquid phase vary depending on an alloy composition and a temperature of a solder alloy in a jet solder bath. Therefore, the present inventors have made further investigations on the relationship between solid phase ratio and liquid phase ratio, obtained by considering an alloy composition and a time gap, and fillet abnormality.

As a result, the present inventors could have obtained the finding that when the solid phase ratio at 235° C. and the liquid phase ratio at 210° C. are in a predetermined range, all of the properties described above are satisfied in a predetermined range of Bi content. In other words, they have obtained the finding that when the Bi content, solid phase ratio and liquid phase ratio are in predetermined ranges, respectively, the occurrence of liftoff phenomenon and the generation of solder bridges and solder icicles can be suppressed and additionally thermal fatigue resistance can be enhanced, even though considering time gap during solidification. All conditions during actual flow soldering would not be satisfied by specifying the solid phase ratio and liquid phase ratio, but the presence or absence of fillet abnormality during flow soldering can be relatively judged by specifying those phase ratios. Even in an alloy composition of Sn—Bi solder alloy containing Ag, Cu, P or the like, the substantially same finding has been obtained from the Bi content, solid phase ratio and liquid phase ratio when the contents of those elements are in predetermined ranges.

Furthermore, the following finding has been obtained: in an alloy composition of Sn—Bi solder alloy containing Ag, liftoff phenomenon is liable to occur by an interaction between Bi and Ag. For this reason, the following finding has been obtained: in the case where the Sn—Bi solder alloy contains Ag, the properties described above are all satisfied by setting Ag content to a predetermined range and additionally specifying the total of Ag content and Bi content.

Furthermore, in the case where the Sn—Bi solder alloy contains Cu, when Cu content exceeds 0.7 mass %, a liquidus temperature is rapidly increased, and a solid-liquid coexistence region spreads. On the other hand, the following finding has been obtained: when the Cu content is 0.7 mass % or less, the solid-liquid coexistence region does not substantially spread, and the properties described above are all satisfied even though considering time gap during solidification.

The present invention achieved based on such findings is as follows.

(1) A solder alloy for forming a fillet, the solder alloy having an alloy composition consisting of, in mass %:
Bi: 0.1 to 0.8%;
Ag: 0 to 0.3%; and
Cu: 0 to 0.7%,
P: 0.001 to 0.1%,
with the balance being Sn, and
a total amount of Ag and Bi being from 0.3 to 0.8%.

The solder alloy for forming a fillet according to the above (1), which has a solid phase ratio at 235° C. of 0.02 vol. % or less, and a liquid phase ratio at 210° C. of 5.0 vol. % or less.

A solder joint having the alloy composition according to the above (1).

In the present invention, the "solid phase ratio at 235° C." means a proportion of a solid phase occupied in the whole volume of the solder alloy at 235° C. The "liquid phase ratio at 215° C." means a proportion of a liquid phase occupied in the whole volume of the solder alloy at 215° C.

BRIEF DESCRIPTION OF THE DRAWINGS

FIG. 1 is a graph showing the relationship between Bi (+Ag) and a liquid phase ratio at 210° C. in Sn—Bi—(Ag)—(Cu)—(P) solder alloy.

MODE FOR CARRYING OUT THE INVENTION

The present invention is described in detail below. In the present description, unless otherwise indicated, "%" in a solder alloy composition is "mass %".

1. Alloy Composition (1) Bi: 0.1 to 0.8%

Bi is an element necessary for enhancing thermal fatigue resistance. The Bi content is 0.1% or more, and preferably 0.2% or more. On the other hand, when Bi is added in a large amount, remarkable segregation during solidifying occurs by the increase of a solid-liquid coexistence region, and frequency of the occurrence of liftoff phenomenon is increased. Therefore, the Bi content is 0.8% or less, and preferably 0.6% or less.

(2) Ag: 0 to 0.3%

Ag is an optional component that can enhance thermal fatigue resistance. When Ag is added, the Ag content is preferably 0.1% or more. When Ag is added together with Bi, segregation during solidifying is accelerated by the addition of Bi, and frequency of the occurrence of liftoff phenomenon is increased. For this reason, the Ag content is 0.3% or less, and preferably 0.2% or less.

(3) Ag+Bi: 0.3 to 0.8%

It has not been considered that the addition of Ag alone to Sn causes the occurrence of liftoff phenomenon. However, in the case where both of Ag and Bi are added to a solder alloy, this accelerates segregation of Bi during solidifying as compared with the case of adding only Bi, and as a result, liftoff phenomenon is liable to occur. For this reason, the total of Ag content and Bi content is 0.8% or less, and preferably 0.6% or less. On the other hand, the addition of both of Ag and Bi suppresses deterioration by thermal fatigue. To exhibit this effect, the total of Ag content and Bi content is 0.3% or more. The suppression of occurrence of liftoff phenomenon and deterioration of fillet is similarly seen in the case of the addition of Bi alone as described before. Therefore, even in the case where Ag is not contained, this range is applied. Specifically, in the case where Ag is not contained, the Bi content is from 0.3 to 0.8%.

(4) Cu: 0 to 0.7%

Cu is an optional element that can improve the strength of a solder alloy. Excessive addition of Cu remarkably increases a melting point of a solder alloy, making it easy to generate solder bridges and solder icicles. When Cu is added in an amount of 0.7%, Cu forms an eutectic crystal together with Sn. However, when Cu is added in an amount of 0.7% or less, a solid-liquid coexistence region does not almost spread. For this reason, the Cu content is preferably 0.7% or less, and more preferably 0.6% or less. In the case where the solder alloy of the present invention is used for flow soldering, the following case would be considered: Cu largely used in wirings and terminals of a board elutes in a solder bath. In such a case, if the Cu content in the solder alloy is not reduced, a composition of an alloy in the solder bath shifts to a hypereutectic crystal side, resulting in the increase of a melting point, and this may lead to fillet abnormality. For this reason, it is better that the Cu content is appropriately decreased depending on the amount of Cu in the solder bath. The Cu content is preferably 0.5% or less, more preferably 0.4% or less, still more preferably 0.3% or less, and particularly preferably 0%.

On the other hand, Cu can exhibit a Cu corrosion preventing effect in the case where a land is Cu, in addition to the improvement of strength. When Cu is contained, the Cu content is preferably 0.05% or more, more preferably 0.1% or more, and still more preferably 0.2% or more.

(5) P: 0.1% or Less

P is an optional element that can suppress oxidation of Sn and can improve wettability. Excessive addition of P hinders fluidity of a solder on the surface of the solder, and brings difficulty to a soldering operation. For this reason, the P content is 0.1% or less, preferably 0.01% or less, and more preferably 0.008% or less. On the other hand, to exhibit the addition effect of P, the P content is preferably 0.001% or more.

(6) Balance: Sn

The balance of the solder alloy in the present invention is Sn. The solder alloy may contain unavoidable impurities in addition to the elements described above. Even in the case where the solder alloy contains unavoidable impurities, the unavoidable impurities do not affect the effects described above. Furthermore, as described hereinafter, even though elements that are not defined in the present invention are contained as unavoidable impurities, those do not affect the effects described above. In the present invention, even if the alloy composition is defined by the closed term (i.e. the term "consisting of"), the closed term (i.e. "consisting of") does not exclude the incorporation of unavoidable impurities.

(7) In, Ni, Zn, Al and Sb

It is better that the solder alloy in the present invention does not contain In, Ni, Zn, Al and Sb in order to suppress fillet abnormality. Those elements are frequently added to a solder alloy in order to enhance heat cycle characteristics. However, in the present invention, if In and Zn are contained, oxide films of In and Zn are formed. As a result, a solder alloy becomes sticky, and solder bridges and solder icicles are liable to be generated in a fillet. Ni, Al and Sb form compounds with Sn and Ag in the solder alloy, and as a result, they cause a remaining solder alloy unmelted during melting, thereby generating solder bridges and solder icicles in a fillet.

2. Solid Phase Ratio at 235° C.: 0.02 vol. % or Less, and Liquid Phase Ratio at 210° C.: 5.0 vol. % or Less In the solder alloy in the present invention, it is preferred to satisfy that a solid phase ratio at 235° C. is 0.02 vol. % or less and a liquid phase ratio at 210° C. is 5.0 vol. % or less, in addition to the requirements of the alloy composition described above.

As the fillet abnormality, the generation of solder bridges and solder icicles are exemplified, in addition to the liftoff phenomenon conventionally investigated. Even though the occurrence of liftoff phenomenon could be suppressed, if solder bridges formed between terminals and solder icicles are generated, electronic instruments do not operate normally by poor connection. To suppress the occurrence of liftoff phenomenon and the generation of solder bridges and solder icicles, information obtained from an alloy composition and an equilibrium diagram is not sufficient, and it is preferable to define by the solid phase ratio and liquid phase ratio at predetermined temperatures obtained based on those.

In the present invention, the solid phase ratio at 235° C. is preferably 0.02 vol. % or less. The reason for this is that in the case of conducting flow soldering using Sn-low Bi solder alloy containing small Bi content, a melting temperature of a jet solder is 235° C. or higher. That is, it is preferred that the solder alloy is completely melted at a temperature of at least 235° C., and the remaining solder alloy unmelted causing solder bridges and solder icicles should not be present. To avoid the generation of solder bridges and solder icicles in a fillet in current printed boards, the solid phase ratio at 235° C. is preferably 0.02 vol. % or less, and more preferably 0 vol. %.

In the present invention, it is preferred that the liquid phase ratio at 210° C. is 5.0 vol. % or less. In Sn-low Bi solder alloy, solidification rapidly proceeds at about 210° C., and if a liquid phase is present in an amount exceeding a predetermined amount, the liquid phase causes segregation during solidifying. The segregation during solidifying increases the possibility leading to the occurrence of liftoff phenomenon. In order to prevent the occurrence of liftoff phenomenon, the liquid phase ratio at 210° C. is preferably 5.0 vol. % or less, more preferably 4.0 vol. % or less, and still more preferably 3.64 vol. % or less. The lower limit of the liquid phase ratio is not particularly limited, and the occurrence of liftoff phenomenon can be suppressed as the liquid phase ratio at 210° C. is lower.

The liquid phase ratio and solid phase ratio defined in the present invention are obtained as a result of consideration of an alloy composition and time gap corresponding to the difference in cooling conditions on front surface or back surface of a board during flow soldering. Those can be obtained by conducting calculation simulation of Sn-low Bi alloy based on Scheil's relational equation using thermodynamic physical property values of elements. As a gradient of temperature change varies with the lapse of time, it is difficult to grasp the gradient of temperature change every actual bonding condition. Therefore, in the present invention, time gap in flow soldering is converted to calorific value, and the solid phase ratio and liquid phase ratio were obtained.

The calculation method of the solid phase ratio and liquid phase ratio in the present invention is described in detail below.

The relationship between solid phase ratio/liquid phase ratio and temperature may be obtained by measuring by thermal analysis such as DSC. However, in the case of thermal analysis, it is necessary to conduct temperature rising/lowering under predetermined conditions, and it is difficult to say that actual bonding conditions are reflected. Therefore, general-purpose thermodynamic database such as thermo-calc was utilized in the present invention. However, it is necessary to consider the change of a solid phase ratio involving solidification. Therefore, Scheil's equation or Scheil's module that is a liquid phase completely mixed model (diffusionless model in solid phase) was used. The Scheil's equation is generally applied to a binary or less alloy, and the Scheil's module is applied to a ternary or more alloy. Of course, the Scheil's module can be applied to a binary or less alloy.

When the Scheil's equation is used, the relationship between a solid phase ratio and a temperature can be obtained using a solid-liquid distribution coefficient obtained from a solute concentration in a solid phase and a solute concentration in a liquid phase, or general-purpose thermodynamic database. Furthermore, when the Scheil's module is used, a solid phase ratio at a predetermined temperature can be calculated by repeating the procedures of adding, as a solid phase, a portion that a liquid phase partially changed to a solid phase when a temperature is decreased by 1° C. to form a liquid phase having a new concentration, and lowering the temperature. More specifically, the solid phase ratio and liquid phase ratio can be calculated using "Pandat" manufactured by Material Design Technology Co., Ltd.

Solid phase ratio and liquid phase ratio corresponding to various solidification processes can be obtained by using this method.

As a result of the calculation, it became clear that the process of solidification differs in Sn—Bi—(Ag)—(Cu)—(P) solder alloy. The solid phase ratio and liquid phase ratio in the present invention show an index for suppressing the generation of solder bridges and solder icicles in addition to the occurrence of liftoff phenomenon, and cannot be obtained by only an alloy composition. The effect of the present invention can be first exhibited by using this index. That is, there was the case where the solid phase ratio and liquid phase ratio were conventionally used. However, to suppress the occurrence of liftoff phenomenon and the generation of solder bridges and solder icicles as in the present invention, an index using both the solid phase ratio at 235° C. and the liquid phase ratio at 210° C. having been considered a solidification process of actual flow soldering is a new index that has not been used before. The solid phase ratio and liquid phase ratio in the present invention obtained by the simulation do not reflect all of the conditions during the actual flow soldering, but do not relatively differ in size relation from the solid phase ratio and liquid phase ratio in the actual flow soldering. Therefore, the occurrence of liftoff phenomenon and the generation of solder bridges and solder icicles can be suppressed by satisfying the solid phase ratio and liquid phase ratio in the present invention.

3. Uses

The solder alloy in the present invention can exhibit the effect in various soldering methods, particularly in flow soldering. The solder alloy is effective in the case of conducting flow soldering for a laminate board including a plurality of substrates that have been laminated. When a jet solder in flow soldering is used for a long period of time, its composition may change. Therefore, the solder alloy can be used as a replenishing solder for obtaining a jet solder having a desired composition. In this case, the replenishing solder can be replenished after adjusting the composition within the range of the present invention. The temperature of the jet solder in the case of conducting flow soldering is approximately from 230 to 240° C. Furthermore, other bonding conditions can be appropriately adjusted depending on the alloy composition, solid phase ratio and liquid phase ratio of the solder alloy.

EXAMPLES

Solid phase ratio at 235° C., liquid phase ratio at 210° C., reliability (thermal fatigue) and fillet abnormality were evaluated using solder alloys having alloy compositions shown in Table 1. Each evaluation method is described below.

(1) Solid Phase Ratio at 235° C. and Liquid Phase Ratio at 210° C.

The solid phase ratio and liquid phase ratio in the examples were calculated using "Pandat" manufactured by Material Design Technology Co., Ltd. The results obtained are shown in Table 1.

(2) Reliability (Thermal Fatigue)

Reliability in the examples was evaluated using thermal fatigue resistance characteristics.

Twelve 4-teminal Sn plated resistances were prepared, terminals of those were inserted in through-holes of a glass epoxy printed board (CEM-3), and flow soldering was conducted. The flow soldering was conducted under the following test conditions using Flow Simulator FS-1 manufactured by Malcom Co., Ltd.

Test Conditions

Solder bath: Flow Simulator FS-1 manufactured by Malcom Co., Ltd.

Amount of solder: 15 kg

Flux: Flux (trade name: ES-1061SP2) manufactured by Senju Metal Industry Co., Ltd.

Solder temperature in solder bath: 255° C.

The soldered printed board was placed in a double tank type automatic testing apparatus in which low temperature condition is −40° C. for 30 minutes and high temperature condition is +85° C. for 30 minutes. The printed board was taken out from the apparatus at 500th cycle, and the outer appearance of fillets (48 places) was observed with an optical microscope. The board in which cracks were not observed was evaluated as "Good", and the board in which cracks were observed was evaluated as "Poor". The results obtained are shown in Table 1.

(3) Fillet Abnormality

In the examples, liftoff phenomenon, solder bridges and solder icicles were evaluated as fillet abnormality. Flow soldering was conducted under the same conditions as in the above (2) Reliability test, and fillets at 48 places were evaluated as follows.

Solder Bridges and Solder Icicles

Whether or not solder bridges were generated was visually evaluated. Furthermore, whether or not solder icicles were generated in a fillet was visually observed. When solder icicles were confirmed, it was evaluated that solder icicles were generated.

Liftoff Phenomenon

After confirming 48 fillets with an optical microscope, each fillet was cut, and a photograph of the cross-section was taken with SEM. Whether or not the fillet is peeled from a land was confirmed by the SEM photograph. When a portion of the fillet separated from the land is present even slightly in the cross-section, it was evaluated that liftoff phenomenon occurred.

Symbols of fillet abnormality in Table 1 are as follows.

A: Fillet abnormality did not occur
B: Liftoff phenomenon occurred
C: Solder icicles were generated
D: Solder bridges were generated

TABLE 1

| | Alloy composition (mass %) | | | | | | | | | Ag + Bi (mass %) | Solid phase ratio at 235° C. (vol. %) | Liquid phase ratio at 210° C. (vol. %) | Reliability (Thermal fatigue) | Fillet abnormality* |
|---|---|---|---|---|---|---|---|---|---|---|---|---|---|---|
| | Sn | Bi | Ag | Cu | P | In | Ni | Zn | Al | Sb | | | | | |
| Reference Example 1 | Balance | 0.3 | | | | | | | | | 0.3 | 0.00 | 0.61 | Good | A |
| Reference Example 2 | Balance | 0.8 | | | | | | | | | 0.8 | 0.00 | 2.26 | Good | A |
| Reference Example 3 | Balance | 0.4 | 0.3 | | | | | | | | 0.7 | 0.00 | 2.51 | Good | A |
| Reference Example 4 | Balance | 0.3 | | 0.1 | | | | | | | 0.3 | 0.00 | 0.82 | Good | A |
| Reference Example 5 | Balance | 0.3 | | 0.6 | | | | | | | 0.3 | 0.00 | 0.74 | Good | A |
| Reference Example 6 | Balance | 0.5 | 0.3 | | | | | | | | 0.8 | 0.00 | 3.35 | Good | A |
| Reference Example 7 | Balance | 0.2 | 0.1 | | | | | | | | 0.3 | 0.00 | 1.00 | Good | A |
| Reference Example 8 | Balance | 0.4 | 0.3 | 0.7 | | | | | | | 0.7 | 0.00 | 3.64 | Good | A |
| Example 1 | Balance | 0.3 | | | 0.003 | | | | | | 0.3 | 0.00 | 0.61 | Good | A |
| Example 2 | Balance | 0.3 | | | 0.008 | | | | | | 0.3 | 0.00 | 0.61 | Good | A |
| Example 3 | Balance | 0.4 | 0.3 | 0.7 | 0.003 | | | | | | 0.7 | 0.00 | 3.64 | Good | A |
| Comparative Example 1 | Balance | 0.04 | | | | | | | | | 0.04 | 0.00 | 0.03 | Poor | A |
| Comparative Example 2 | Balance | 0.9 | 0.2 | | | | | | | | 1.1 | 0.00 | 6.00 | Good | B |
| Comparative Example 3 | Balance | 0.8 | 0.40 | | | | | | | | 1.2 | 0.00 | 6.06 | Good | B |
| Comparative Example 4 | Balance | 0.10 | 0.10 | | | | | | | | 0.2 | 0.00 | 0.41 | Poor | A |
| Comparative Example 5 | Balance | 0.3 | | 1 | | | | | | | 0.3 | 0.03 | 0.72 | Good | D |
| Comparative Example 6 | Balance | 0.3 | | 1.5 | | | | | | | 0.3 | 1.70 | 0.72 | Good | C, D |
| Comparative Example 7 | Balance | 0.3 | | | | 6 | | | | | 0.3 | 0.00 | 17.48 | Poor | C, D |
| Comparative Example 8 | Balance | 0.3 | | 0.7 | | 6 | | | | | 0.3 | 0.00 | 26.13 | Poor | C, D |
| Comparative Example 9 | Balance | 0.3 | | | | | 0.2 | | | | 0.3 | 0.14 | 0.67 | Good | D |
| Comparative Example 10 | Balance | 0.3 | | 0.1 | | | 0.2 | | | | 0.3 | 0.09 | 0.87 | Good | D |

TABLE 1-continued

| | Alloy composition (mass %) | | | | | | | | | Ag + Bi (mass %) | Solid phase ratio at 235° C. (vol. %) | Liquid phase ratio at 210° C. (vol. %) | Reliability (Thermal fatigue) | Fillet abnormality* |
|---|---|---|---|---|---|---|---|---|---|---|---|---|---|---|
| | Sn | Bi | Ag | Cu | P | In | Ni | Zn | Al | Sb | | | | | |
| Comparative Example 11 | Balance | 0.4 | 0.3 | | | | | 0.5 | | | 0.7 | 0.00 | 7.55 | Good | C, D |
| Comparative Example 12 | Balance | | 0.3 | | | | | | 0.5 | | 0.3 | 2.14 | 0.00 | Good | C, D |
| Comparative Example 13 | Balance | | 0.3 | 0.7 | | | | | | 5 | 0.3 | 26.94 | 0.75 | Good | D |

Fillet abnormality*A: Normal, B: Liftoff phenomenon, C: Solder icicles, D: Solder bridges As shown in Table 1, in Examples 1 to 3, there was no problem regarding reliability and fillet abnormality did not occur, in any alloy composition.

On the other hand, in Comparative Example 1, the Bi content is small. Therefore, thermal fatigue resistance was poor. In Comparative Example 2, the Bi content is large and the liquid phase ratio at 210° C. is high. Therefore, liftoff phenomenon occurred. In Comparative Example 3, the Ag content is large, Ag+Bi exceeds 0.8%, and additionally the liquid phase ratio at 210° C. is high. Therefore, liftoff phenomenon occurred. In Comparative Example 4, Ag+Bi is lower than 0.3%. Therefore, thermal fatigue resistance was poor. In Comparative Examples 5 and 6, the Cu content is large, and the solid phase ratio at 235° C. is high. Therefore, the solder alloy became sticky. Furthermore, solder bridges were generated in Comparative Example 5, and solder bridges and solder icicles were generated in Comparative Example 6.

In Comparative Examples 7 and 8, In was contained, and as a result, the liquid phase ratio at 210° C. is high, fatigue resistance is poor, and solder bridges and solder icicles were generated. In Comparative Examples 9 and 10, Ni was contained, and as a result, the solid phase ratio at 235° C. is high, and solder bridges were generated. In Comparative Example 11, Zn was contained, and as a result, the liquid phase ratio at 210° C. is high, and solder bridges and solder icicles were generated. In Comparative Examples 12 and 13, Al and Sb were contained, respectively, and as a result, the solid phase ratio at 235° C. is high. Furthermore, solder bridges and solder icicles were generated in Comparative Example 12, and solder bridges were generated in Comparative Example 13.

To clarify the effect of the present invention from the results in Table 1, the present invention is further described below using FIG. 1.

FIG. 1 is a graph showing the relationship between Bi (+Ag) and a liquid phase ratio at 210° C. in Sn—Bi—(Ag)—(Cu)—(P) solder alloy. The results of Reference Examples 1 to 8, Examples 1 to 3 and Comparative Examples 1 to 6, excluding alloy compositions containing In, Ni, Zn, Al or Sb having greatly different behaviors in the solid-liquid coexistence region, were plotted in FIG. 1. From FIG. 1, when Bi (+Ag) exceeds 0.8%, the liquid phase ratio at 210° C. was greatly increased, and when the liquid phase ratio exceeds 5.0% as in Comparative Examples 2 and 3, liftoff phenomenon occurred. On the other hand, the liquid phase ratio is low in Comparative Examples 1, 4, 5 and 6. Therefore, although liftoff phenomenon did not occur, thermal fatigue resistance was poor and solder bridges and solder icicles were generated as described before.

From the above, the solder alloy in the present invention can suppress the occurrence of liftoff phenomenon and the generation of solder bridges and solder icicles, and can have excellent thermal fatigue resistance. Therefore, the solder alloy can form high quality fillet widely over the whole of electronic equipments such as home appliances and communication equipments.

While the invention has been described in detail and with reference to specific embodiments thereof, it will be apparent to one skilled in the art that various changes and modifications can be made therein without departing from the spirit and scope thereof.

This application is based on Japanese Patent Application No. 2015-233363 filed on Nov. 30, 2015, the entire subject matter of which is incorporated herein by reference.

The invention claimed is:

1. A solder alloy for forming a fillet, the solder alloy having an alloy composition consisting of, in mass %:
   Bi: 0.3 to 0.8%;
   Ag: 0 to less than 0.2%; and
   P: 0.001 to 0.1%,
   with the balance being Sn, and
   a total amount of Ag and Bi being from 0.3 to 0.8%, whereby deterioration of the alloy by thermal fatigue and fillet abnormality is suppressed.

2. A solder joint having an alloy composition consisting of, in mass %:
   Bi: 0.3 to 0.8%;
   Ag: 0 to less than 0.2%; and
   P: 0.001 to 0.1%,
   with the balance being Sn, and
   a total amount of Ag and Bi being from 0.3 to 0.8%, whereby deterioration of the alloy by thermal fatigue and fillet abnormality is suppressed.

3. The solder alloy for forming a fillet according to claim 1, wherein the alloy has a solid phase ratio at 235° C. of 0.02 vol. % or less, and a liquid phase ratio at 210° C. of 5.0 vol. % or less.

4. The solder alloy for forming a fillet according to claim 1, wherein the fillet abnormality includes the presence of liftoff phenomenon, solder icicles, or solder bridges.

* * * * *